J. REID.
SUPPORT FOR VEHICLE CANOPIES.
APPLICATION FILED MAR. 17, 1910.
988,814.
Patented Apr. 4, 1911.
2 SHEETS—SHEET 1.
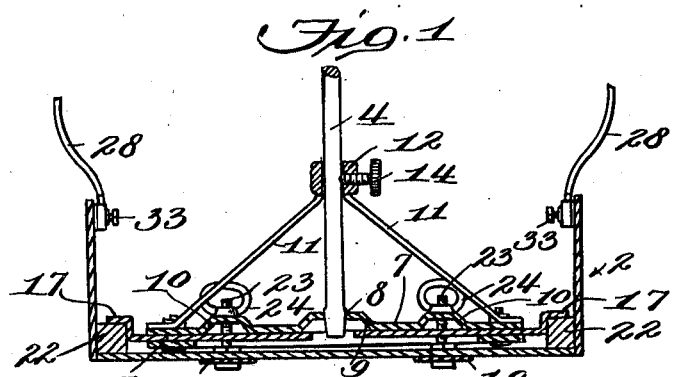
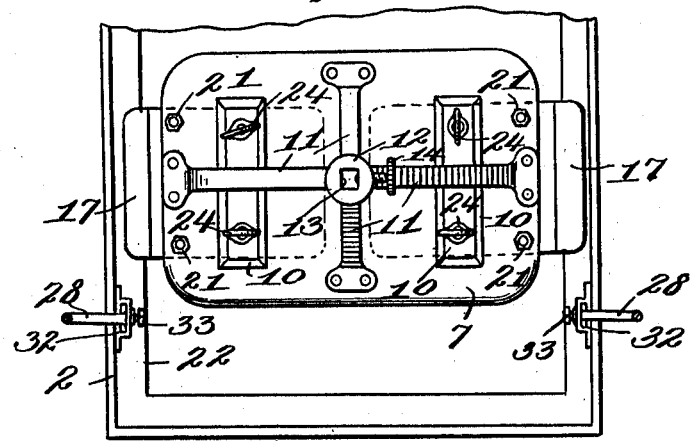
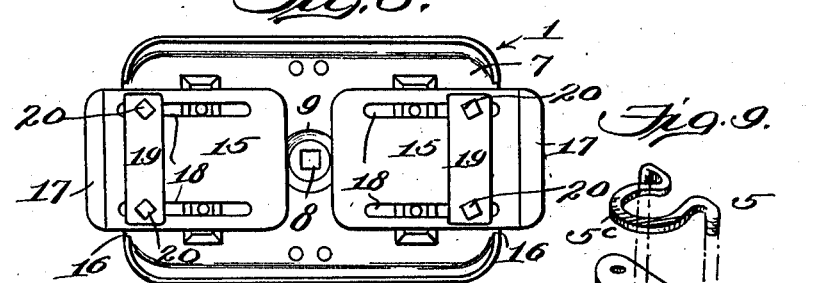
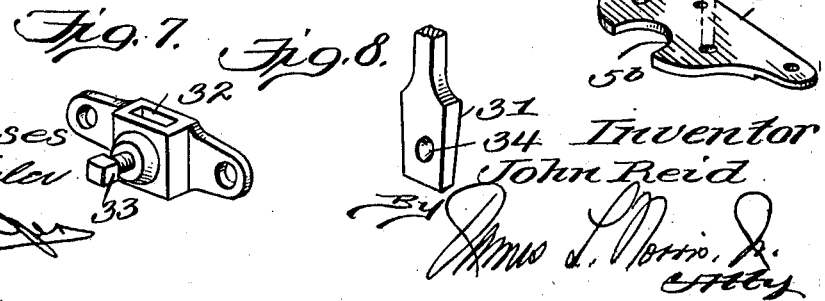
Witnesses
Inventor
John Reid J. REID.
SUPPORT FOR VEHICLE CANOPIES.
APPLICATION FILED MAR. 17, 1910.
988,814.
Patented Apr. 4, 1911.
2 SHEETS—SHEET 2.
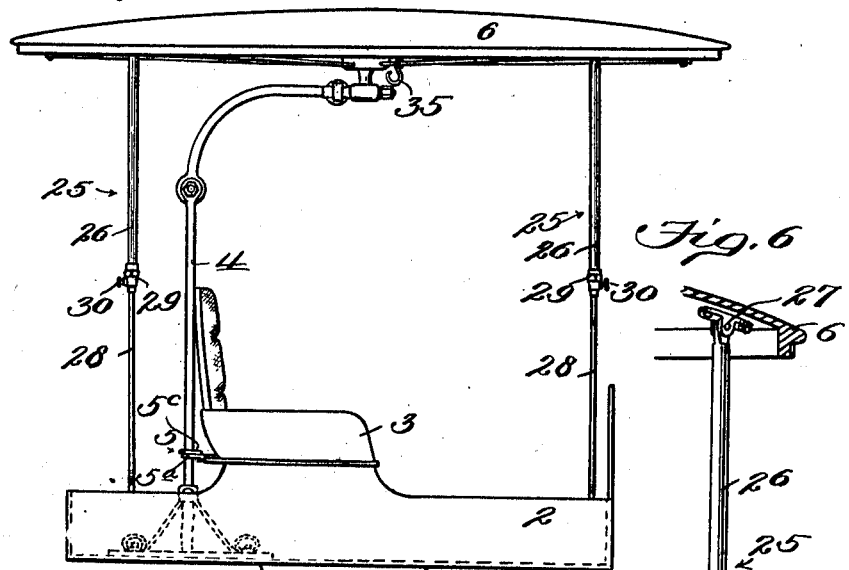

UNITED STATES PATENT OFFICE.

JOHN REID, OF CHILDRESS, TEXAS.

SUPPORT FOR VEHICLE-CANOPIES.

988,814.  Specification of Letters Patent.  Patented Apr. 4, 1911.

Application filed March 17, 1910. Serial No. 549,888.

*To all whom it may concern:*

Be it known that I, JOHN REID, a citizen of the United States, residing at Childress, in the county of Childress and State of Texas, have invented new and useful Improvements in Supports for Vehicle-Canopies, of which the following is a specification.

This invention relates to improvements in supports for vehicle canopies and its objects are, first, to provide a supporting arrangement for relieving the seat and the body of the vehicle against all stresses incident to the weight of the canopy or to wind pressure thereon; second, to provide a supporting arrangement which may be attached to vehicles of different widths and forms an efficient brace for the canopy standard, which may, when desired, be easily and quickly removed from the vehicle with the canopy, and which is capable of supporting the canopy from the ground; and third, to provide adjuncts which are used in the case of a storm or high wind to hold the canopy against displacement and to form a sort of a frame for the storm curtains which are hung from the canopy.

Toward the accomplishment of the first object the invention proposes an improved base in which the canopy standard is removably fitted and by which said standard is firmly held.

Toward the accomplishment of the second object the invention proposes improvements in the means for supporting the base with relation to the floor of the vehicle.

Toward the accomplishment of the third object the invention proposes a series of brace rods of improved construction which are normally folded against the under side of the canopy and which may be quickly and readily extended in a time of storm or high wind and connected to the body of the vehicle.

An embodiment of the invention is illustrated in the accompanying drawings wherein—

Figure 1 is a transverse sectional view of the improved supporting base above referred to; Fig. 2 is a top plan view thereof; Fig. 3 is a bottom plan view thereof; Fig. 4 is a side elevation showing a vehicle equipped with a canopy and with the improved bracing adjuncts above referred to; Fig. 5 is a bottom plan view of the canopy showing the bracing adjuncts folded thereagainst; Fig. 6 is a detail perspective view of one of the bracing adjuncts; Fig. 7 is a detail perspective view of a socket to receive the lower end of a brace rod; Fig. 8 is a detail perspective view showing the lower end of the brace rod constructed for engagement in the socket shown in Fig. 7; and Fig. 9 is a detail perspective view of a bracket to be specifically referred to.

Similar characters of reference designate corresponding parts throughout the several views.

The improved base to which reference has been made is designated in a general way by the numeral 1 and is supported with relation to the floor of the vehicle body 2 and in the rear of the seat 3. The canopy standard, as 4, is supported by said base and is additionally held by a bracket, as 5, which is attached to and projects rearwardly from the seat 3. The bracket 5, to facilitate the removal of the standard therefrom, includes a plate, as $5^a$, which is attached to the seat frame and which has a recess, as $5^b$, to receive the canopy standard 4. The latter is held in the recess aforesaid, by a clip or loop, as $5^c$, which is removably secured to the plate $5^a$, *e. g.* by having its end portions formed as downturned pins which engage in openings provided in said plate. The standard 4 carries at its upper end a canopy, as 6.

The base 1 includes in its organization and as a main element thereof, a plate, as 7, which may advantageously be formed of sheet metal with its under face dished, as shown in Fig. 3, and which is provided with a central flat sided opening, as 8, formed in a raised boss, as 9, and at each side of the opening with a transverse raised rib, as 10.

Associated with the plate 7 is a bracing and attachment frame for the standard 4. This frame consists of four arms, as 11, which are disposed at right angles to one another, and the two which are disposed longitudinally of the plate are attached centrally of the end edges of the plate, and the two which are disposed transversely of the plate are attached centrally of the side edges thereof. The arms 11 extend upwardly in convergent relation and are all connected to a sleeve, as 12, which is provided with a flat sided opening, as 13, similar in form to, and alining with, the opening 8 aforesaid. The lower end portion of the standard 4 is passed through the opening 13 and through the opening 8, and is rigidly held by a securing screw, as 14, which is threaded laterally through the sleeve 12 and engages frictionally against the standard 4. The latter may have its extreme lower end portion which passes through the opening 8 of tapered form to more efficiently seat in said opening.

To provide for supporting the plate 7 and for securing the same firmly in position, the following organization is employed. A pair of hanger plates, as 15, is associated with the under face of the plate 7 and at opposite ends thereof. The plates 16 are longitudinally adjustable and are passed through cut-away portions, as 16, at the ends of the plate 7. At the outer edge portions of the plates 15, transverse lips, as 17, offset above the planes of the plates 15, are provided. The plates 15 are each formed with at least a pair of longitudinal slots, as 18, and to maintain the association of the plates 15 with the plate 7, straps, as 19, are employed. The straps 19 are disposed transversely of the plate 7 and against the under faces of the plates 15, and are caused to bind frictionally against said plates 15 in order that the latter may be held at any desired positions to which they are set. For this purpose fastening bolts or equivalent devices, as 20, are employed, the heads of which lie against the straps 19 and the shanks of which pass through the slots 18 and through the plate 7 and are provided with retaining nuts 21 which are tightened against the upper face of the plate 7. The plates 15 are adjusted with regard to the width of the vehicle to which the arrangement is to be applied and their lips 17 constitute, in effect, hangers for the plate 7 and engage the side pieces 22 of the body frame of the vehicle. It will thus be apparent that the plates 15 are adjusted outwardly or inwardly with relation to the plate 7 in accordance with whether the wagon is of greater or less width.

The base is held fixed with relation to the body of the vehicle by positive fastening devices comprising threaded shanks, as 23, which are attached to the bottom of the vehicle body and project through the slots 18 aforesaid and through openings in the ribs 10. Wing nuts, as 24, are provided on the upper ends of the shanks 23 and bear against the faces of said ribs, said nuts serving to hold the plate 7 against upward and lateral displacement, which would otherwise be incident to the jarring of the vehicle.

As an additional means of supporting the canopy 6, bracing adjuncts of the construction illustrated in Figs. 4 to 8, are employed. Each brace, designated generally by the numeral 25, consists of a rod which is formed of two sections, the one, as 26, being in the form of a hollow tube and being pivotally hung, as at 27, from the under face of the canopy, and the other, as 28, being in the form of a solid rod which telescopes into the section 26, passing through a sleeve, as 29, provided at the end of the latter. For the purpose of holding the rod 28 at desired positions with relation to the tubular section 26, a screw, as 30, is threaded laterally through the sleeve 29 and frictionally engages said rod. The lower end of the rod 28 may, for convenience, be bent inwardly as shown in Fig. 6. Such a construction would be employed when the dimensions of the canopy exceed those of the body of the vehicle. At its lower extremity the rod 28 is formed of substantial wedge shape, as at 31, (Fig. 8) for conformable engagement in a socket, as 32 (Fig. 7). The sockets 32 are attached to the body of the vehicle and are provided with screws, as 33, the ends of which project into the bores of said sockets and engage in recesses 34 which are formed in the ends 31 of the rods 28.

In Fig. 4 the braces are shown in their operative positions, *i. e.* as depending from the canopy 6, with the rods 28 extended for the necessary distance and their lower end portions 31 secured in the sockets 32. The braces when so desired, serve a two-fold purpose, viz. they provide against the displacement of the canopy during a storm or a high wind, and they provide a sort of a frame for maintaining the proper relation of the storm curtains which are hung from the canopy. Ordinarily it will not be necessary to use the braces 25 and accordingly the rods 28 are telescoped into the tubular sections 26 and the braces are swung inwardly on their pivots 27, to positions against the under face of the canopy whereat they are held by hooks, as 35. Two of such hooks, for convenience, may be employed, the one at the right hand side of the canopy supporting the braces at the right hand side of the canopy, and the one at the left hand side of the canopy in like manner supporting the braces at the same side. This arrangement is shown in Fig. 5.

It will be apparent from the foregoing description that the improved base construction may be permanently associated with the vehicle and affords an efficient means for holding the standard 4 against displacement in any direction. The base construction moreover provides an efficient support for the standard and the canopy when it is desired to use the same independently of the vehicle. In such a case the plate 7 and its adjuncts, together with the standard and canopy, are removed from the vehicle by simply removing the nuts 24 from the screw shanks 23 and by disengaging the clip 5ᶜ from the plate 5ᵃ. The base may then be lifted from the vehicle and placed in any desired position upon the ground. When so positioned, a suitable foot-board (not shown) may be connected to the base, to provide the requisite supporting area.

Having fully described my invention, I claim:

1. In a support for vehicle canopies, the combination of a canopy standard, a base plate having a central opening to receive the lower end portion of the standard, a pair of hanger plates associated with the under face of the base plate and each provided with longitudinal slots, straps extending transversely of the hanger plates, connecting bolts which pass through the slots to connect the straps and the base plate and hold the former against the under faces of the hanger plates, screw shanks extending from the floor of the vehicle body through the slots and through the base plate, and securing nuts provided on the upper ends of the shanks.

2. In a support for vehicle canopies, the combination of a canopy standard and a canopy carried thereby, a base having means for the attachment of the standard thereto, means for removably attaching the base to the floor of the body of the vehicle, a plurality of braces for the canopy, each brace consisting of a tubular section, a section telescopically related thereto and a screw for holding the sections in relation to one another, one of the sections being pivoted to the under face of the canopy, means for removably securing the end of the other section against a side of the vehicle, and means for supporting the braces folded against the under face of the canopy.

3. In a support for vehicle canopies, the combination of a canopy, its supporting standard, a plurality of braces for the canopy, each brace consisting of a tubular section, a section telescopically related thereto and a screw for holding the sections in relation to one another, one of the sections being pivoted to the under face of the canopy, means for removably securing the end of the other section against a side of the vehicle, and means for supporting the braces folded against the under face of the canopy.

4. In a support for vehicle canopies, the combination of a canopy, its supporting standard, a plurality of braces pivoted to the canopy and capable of being folded thereon or of depending therefrom, and means for removably attaching the lower ends of the braces in their depending relation to the sides of the body of the vehicle.

5. In a support for vehicle canopies, the combination of a canopy standard and a canopy carried thereby, a base having means for the attachment of the standard thereto, means for removably attaching the base to the floor of the body of the vehicle, a plurality of braces pivoted to the canopy and capable of being folded thereon or of depending therefrom, and means for removably attaching the lower ends of the braces in their depending relation, to the sides of the body of the vehicle.

6. In a support for vehicle standards, the combination with a canopy standard, of a supporting base removably associated with the floor of the vehicle, and in which the standard is fitted, and a bracket consisting of a plate attached to the seat of the vehicle and having a recess in which the standard is fitted and from which the standard is readily removable, the plate having openings at each side of the recess, and a clip confining the standard in the recess, the clip consisting of a member which is formed as a loop to partially surround the standard, which rests upon the plate, and which has its end portions formed as downturned pins to engage in said openings.

In testimony whereof I have hereunto set my hand in presence of two subscribing witnesses.

JOHN REID.

Witnesses:
Wm. J. Stringer,
W. T. Ward.

---

Copies of this patent may be obtained for five cents each, by addressing the "Commissioner of Patents, Washington, D. C."